United States Patent
He

(10) Patent No.: US 7,289,583 B2
(45) Date of Patent: Oct. 30, 2007

(54) METHOD OF AND APPARATUS FOR SINGLE ANTENNA INTERFERENCE REJECTION THROUGH RELAXATION

(75) Inventor: Shousheng He, Södra Sandby (SE)

(73) Assignee: Telefonktiebolagel LM Ericsson (publ), Stockholm (SE)

(*) Notice: Subject to any disclaimer, the term of this patent is extended or adjusted under 35 U.S.C. 154(b) by 639 days.

(21) Appl. No.: 10/685,218

(22) Filed: Oct. 14, 2003

(65) Prior Publication Data
US 2005/0078777 A1 Apr. 14, 2005

(51) Int. Cl.
*H03D 1/04* (2006.01)

(52) U.S. Cl. ............... 375/346; 375/350; 375/130; 370/347; 370/337; 370/442; 426/649; 426/573

(58) Field of Classification Search ......... 375/346, 375/350, 130; 370/347, 337, 442; 426/649, 426/573
See application file for complete search history.

(56) References Cited

U.S. PATENT DOCUMENTS

| 6,185,175 | B1 | 2/2001 | Zook |
| 6,249,179 | B1 | 6/2001 | Maalej et al. |
| 6,314,147 | B1 | 11/2001 | Liang et al. |
| 6,470,047 | B1 | 10/2002 | Kleinerman et al. |
| 7,031,411 | B2* | 4/2006 | Arslan et al. ............ 375/346 |
| 2005/0111596 | A1* | 5/2005 | Olsson et al. ............ 375/346 |

FOREIGN PATENT DOCUMENTS

| EP | 1255387 | 11/2002 |
| WO | WO 01/39448 A1 | 5/2001 |
| WO | WO-01/61950 | 8/2001 |
| WO | WO 01/93439 A1 | 12/2001 |
| WO | WO 02/11378 A1 | 2/2002 |
| WO | WO 02/103972 A1 | 12/2002 |

OTHER PUBLICATIONS

U.S. Appl. No. 10/684,598.
MMSE Decision-Feedback Equalizers: Finite-Length Results; Naofal Al-Dhahir et al.; IEEE Transactions on Information Theory, vol. 41, No. 4, Jul. 1995; pp. 961-975.

* cited by examiner

*Primary Examiner*—Chieh M. Fan
*Assistant Examiner*—Eva Zheng
(74) *Attorney, Agent, or Firm*—Michael Cameron

(57) ABSTRACT

A method of and apparatus for single antenna interference rejection (SAIR) relaxation. Interference in a received signal is reduced by performing synchronization and whitening of the received signal. The synchronization and whitening includes performing the following steps at least one time: 1) performing a synchronization and vector-noise-correlation estimation of an input signal to yield an interference model; and 2) performing a spatio-temporal whitening operation using the interference model and the input signal to yield an updated received signal. The input signal is the received signal when the step of performing the synchronization and vector-noise-correlation estimation is performed a first time. The input signal is the updated received signal when the step of performing the synchronization and vector-noise-correlation estimation is performed following the first time.

17 Claims, 2 Drawing Sheets

METHOD OF AND APPARATUS FOR SINGLE ANTENNA INTERFERENCE REJECTION THROUGH RELAXATION

RELATED APPLICATIONS

This patent application is related in subject matter to and incorporates by reference the entire disclosure of U.S. patent application Ser. No. 10/684,598, entitled Method of and Apparatus for Noise Whitening Filtering, and filed on the same date as this patent application.

BACKGROUND OF THE INVENTION

1. Technical Field of the Invention

The present invention relates in general to single antenna interference rejection (SAIR) in digital time-division multiple access communications systems and, more particularly, to SAIR in communications systems operating according to Global System of Mobile communications (GSM).

2. History of Related Art

Receiver performance in wireless digital time-division multiple access (TDMA) communication systems such as, for example, those operating according to GSM, Enhanced Data GSM Evolution (EDGE), and Digital Advanced Mobile Service (DAMPS), is often interference-limited. Interference might come from, for example, other users. Users operating on identical carrier frequencies in neighboring cells might create co-channel interference (CCI), while users operating on adjacent carrier frequencies might create adjacent-channel interference (ACI).

Network capacity of the communication systems is limited by cellular frequency planning, which has to comply with the CCI and ACI performance of the receivers. Thus, any substantial improvement to receiver CCI or ACI performance can significantly increase the network capacity. SAIR is an approach used to increase the network capacity. SAIR utilizes the single-dimensional nature in the complex domain of interference in, for example, a GSM system. Real and imaginary samples of a complex received signal are treated as if the real and imaginary samples were from different propagation channels. Spatio-temporal diversity is exploited to suppress interference.

FIG. 1 is a functional block diagram that illustrates a current SAIR process. In FIG. 1, ⇒indicates a dependency relation. Variables shown in FIG. 1 are as follows:

r received signal
r' updated received signal
t training sequence
$h_{\{n+m\}}$ n+m tap channel estimate
$A_{\{m+1\}}$ interference model
p synchronization position
s symbol estimate A SAIR process 100 begins with burst synchronization of the received signal r at a synchronization block 102. At a Generalized Least Square (GLS) channel Spatio-Temporal Whitening (STW) estimation block 104, a joint estimation of an m-th order Vectorized Auto-Recursive (VAR) model of the interference $A_{\{m+1\}}$ and the (n+m)-th order channel estimate $h_{\{n+m\}}$ is performed. The interference model $A_{\{m+1\}}$ is output from the GLS channel STW estimation block 104 to a STW filter block 106. The received signal r is also input to the STW filter block 106. The received signal r is filtered by the STW filter block 106 with coefficients in a matrix polynomial to yield an updated received signal r'.

The equalizer 108 also receives the interference model $A_{\{m+1\}}$ from the GLS channel STW estimation block 104. The equalizer 108 estimates data symbols of the transmission and yields the symbol estimate s.

In a GSM system, for example, the order of the interference model must be sufficiently low (e.g., m<3) for identifiability and complexity reasons. There are at least two drawbacks of the process 100. First, a span of the composite channel (i.e., the channel seen from the equalizer) for the received signal r is extended from n symbols to (n+m) symbols by the process 100. For a Decision Feedback Sequence Estimation (DFSE) equalizer, the channel extension is not a critical drawback, since a feedback span extension does not impose any prohibitive complexity increase. However, for a Maximum Likelihood Sequence Estimator (MLSE) equalizer, a complexity increase due to the process 100 is exponential. If, as in many common platforms, a Viterbi processor for the MLSE equalizer is pre-built with dedicated hardware, the extension makes implementation of SAIR as shown in the process 100 very difficult, if not impossible.

Second, a joint GLS estimation of the interference model $A_{\{m+1\}}$ and the n+m tap channel estimate $h_{\{n+m\}}$ is both computationally expensive and often inaccurate. The inaccuracy impairs receiver performance under many channel conditions, such as, for example, when no strong interference is present or with high-level background noise. The background noise can be caused not only by physical disturbances, such as thermal noise, but also by non-ideal implementation factors, such as, for example, quantization noise. In addition, numerical properties of the joint estimation can be also critically ill-conditioned, which can make a fixed-point implementation of the algorithm very demanding. In GLS estimation, inversion of a fairly large matrix (e.g., up to 13×13) must be solved. Under realistic channel conditions, the matrix is close to singular, which makes fixed-point computations unstable due to rounding or truncation errors.

SUMMARY OF THE INVENTION

These and other drawbacks are overcome by embodiments of the present invention, which provides a method of and apparatus for SAIR relaxation. A method of reducing interference in a received signal includes performing a synchronization of the received signal to yield a synchronization position and determining an updated received signal using the synchronization position and the received signal. The step of determining the updated received signal includes iteratively performing interference-model estimation and spatio-temporal whitening. An updated synchronization position of the updated received signal is determined. A channel estimate is determined using the updated synchronization position and the updated received signal.

A method of reducing interference in a received signal includes performing synchronization and whitening of the received signal. The synchronization and whitening includes performing the following steps at least one time: 1) performing a synchronization and vector-noise-correlation estimation of an input signal to yield an interference model; and 2) performing a spatio-temporal whitening operation using the interference model and the input signal to yield an update received signal. The input signal is the received signal when the step of performing the synchronization and vector-noise-correlation estimation is performed a first time of the at least one time. The input signal is the updated received signal when the step of performing synchronization and vectornoise-correlation estimation is performed following the first time of the at least one time. A channel estimate is determined using the updated received signal.

An apparatus for reducing interference in a received signal includes means for performing a synchronization of the received signal to yield a synchronization position and means for determining an updated received signal using the synchronization position and the received signal. The means for determining the updated received signal includes means for iteratively performing interference-model estimation and spatio-temporal whitening. The apparatus also includes means for determining an updated synchronization position of the updated received signal and means for determining a channel estimate using the updated synchronization position and the updated received signal.

An apparatus for reducing interference in a received signal includes means for performing synchronization and whitening of the received signal. The means for synchronization and whitening is adapted to perform the following steps at least one time: 1) performing a synchronization and vector-noise-correlation estimation of an input signal to yield an interference model; and 2) performing a spatio-temporal whitening operation using the interference model and the input signal to yield an updated received signal. The input signal is the received signal when the step of performing the synchronization and vector-noise-correlation estimation is performed a first time of the at least one time. The input signal is the updated received signal when the step of performing synchronization and vector-noise-correlation estimation is performed following the first time of the at least one time. The apparatus also includes means for determining a channel estimate using the updated received signal.

An article of manufacture for reducing interference in a received signal includes at least one computer readable medium and processor instructions contained on the at least one computer readable medium. The processor instructions are configured to be readable from the at least one computer readable medium by at least one processor. The processor instructions cause the at least one processor to operate as to: 1) perform a synchronization of the received signal to yield a synchronization position; 2)-determine an updated received signal using the synchronization position and the received signal; 3) determine an updated synchronization position of the updated received signal; and 4) determine a channel estimation using the updated synchronization position and the updated received signal. The step of determining the updated received signal includes iteratively performing interference-model estimation and spatio-temporal whitening.

An article of manufacture for reducing interference in a received signal includes at least one computer readable medium and processor instructions contained on the at least one computer readable medium. The processor instructions are configured to be readable from the at least one computer readable medium by at least one processor. The at least one processor is caused to operate as to perform synchronization and whitening of the received signal. The synchronization and whitening includes performing the following steps at least one time: 1) performing a synchronization and vector-noise-correlation estimation of an input signal to yield an interference model; and 2) performing a spatio-temporal whitening operation using the interference model and the input signal to yield an updated received signal. The input signal is the received signal when the step of performing the synchronization and vector-noise-correlation estimation is performed a first time of the at least one time. The input signal is the updated received signal when the step of performing the synchronization and vector-noise-correlation estimation is performed following the first time of the at least one time. The at least one processor is also caused to operate as to determine a channel estimate using the updated received signal.

BRIEF DESCRIPTION OF THE DRAWINGS

A more complete understanding of exemplary embodiments of the present invention can be achieved by reference to the following Detailed Description of Exemplary Embodiments of the Invention when taken in conjunction with the accompanying Drawings, wherein like reference numerals used throughout the drawings denote the same or similar features.

DETAILED DESCRIPTION OF EXEMPLARY EMBODIMENTS OF THE INVENTION

To aid in illustrating the principles of the present invention, the apparatus and method are presented in the context of a GSM mobile station. It is not intended that the scope of the invention be limited to the examples presented herein. One skilled in the art can apply the principles of the present invention to numerous other types of communication systems as well.

Figure 1:
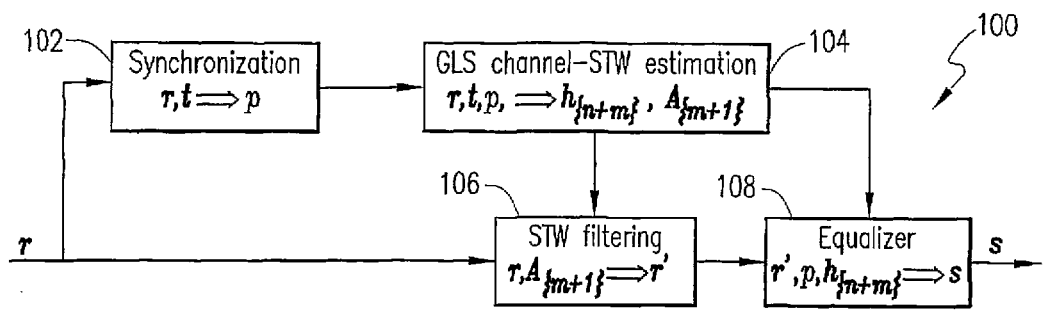
FIG. 1, previously described, is a functional block diagram that illustrates an exemplary SAIR process.
Figure 2:
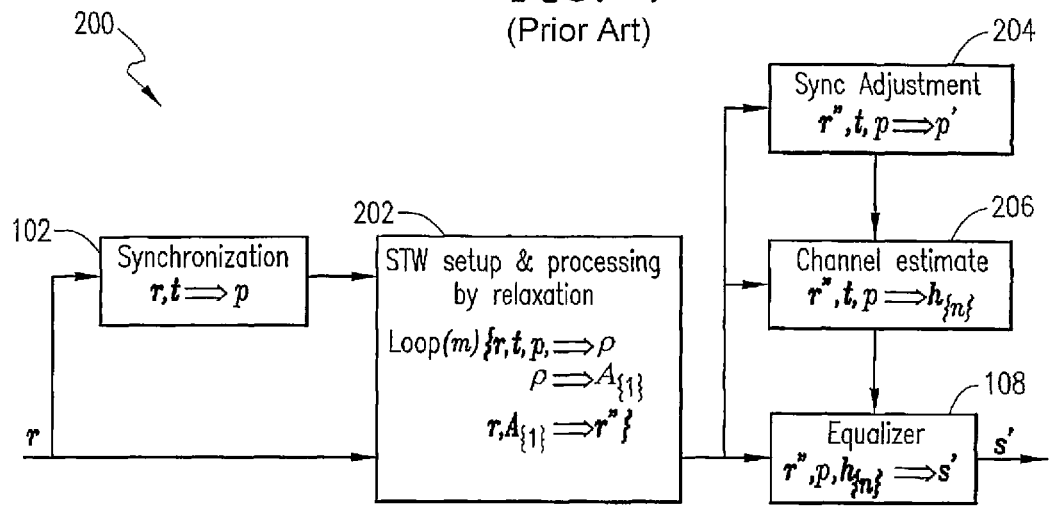
FIG. 2 is a functional block diagram that illustrates an exemplary SAIR process in accordance with a first embodiment of the present invention.

FIG. 2 is a functional block diagram that illustrates an exemplary SAIR process in accordance with a first embodiment of the present invention. In FIG. 2, $\Rightarrow$ indicates a dependency relationship. Variables shown in FIG. 2 are as follows:

r received signal
r" updated received signal
t training sequence
p synchronization position
p' updated synchronization position
$h_{\{n\}}$ n tap channel estimate
$\rho$ noise correlate
$A_{\{l\}}$ interference model
s' symbol estimate A SAIR process 200 begins at the synchronization block 102 with burst synchronization of the received signal r. The received signal r is also input to a Spatio-Temporal Whitening setup & processing by relaxation block (STW block) 202. The term relaxation is used in parallel computing and in this application to describe a decoupling of a data dependency of computations. The synchronization block 102 outputs the synchronization positions to the STW block 202.

The updated received signal r" output by the STW block 202 is provided to a synchronization adjustment block 204, a channel estimation block 206, and the equalizer 108. The synchronization adjustment block 204 adjusts a synchronization position after the STW block 202. Synchronizationpoint adjustment by the synchronization adjustment block 204 allows symbol extension to be avoided. The synchronization adjustment block 204 rectifies any error-prone synchronization attained due to strong interference and adjusts the synchronization position so that the composite channel for the received signal r" with a designated span is able to cover most of the energy of the received signal r.

After synchronization adjustment at the synchronization adjustment block 204, an n-tap channel estimation is made at the channel estimation block 206. Since no symbol extension has occurred, a more computationally efficient least squares (LS) estimation can be applied directly. The equalizer 108 receives the updated received signal r" and the n tap channel estimate $h_{\{n\}}$ and estimates data symbols of the transmission to yield the symbol estimate s'.

The STW block 202 performs interference-model estimation and STW processing. In contrast to the process 100, in which a lumped-model estimation is performed in a predetermined order before lumped STW processing is performed, a relaxation approach based on a Vectorized Noise Correlation (VNC) is employed. At the STW & processing relaxation block 202, a first-order VNC estimation and STW processing process is iterated m times. The process implemented in the STW setup & processing relaxation block 202 can be illustrated by the following exemplary pseudo-code, in which // indicates non-code comments:

```
SAIRRelaxation (m) {
    For (i = 0 : m - 1) {
        // noise estimation via channel estimation
        v = EstNoise (r, t, n + i);
        // VNC
        P_k = E{v^T(i)v(i + k)};
        // 1st order VAR model of the interference
        A(z) = I - P_0^-1 P_1 z^-1;
        if (i = m - 1) {
            // spatio-decorrelation in last iteration
            Q = P_0 + P_1^T A_1;
            L · L^T = Q;
            A(z) = LA(z);
        }
        // STW filtering
        r = r · A;
    }
}
```

With a second synchronization and channel estimation as in the SAIR process 200, symbol extension of the received signal r due to spatio-temporal whitening processing can be avoided. A SAIR implementation can thus be implemented in receiver architectures in which an equalizer is built in dedicated hardware that has a fixed composite channel span. The relaxation approach employed in the STW block 202 reduces computational complexity significantly, since all matrix operations are now limited to 2×2 with real elements. The channel model estimation is decoupled from the interference model estimation. Due to improved estimation conditions, the proposed SAIR algorithm has shown improved performance in channel conditions in which the background noise is at a realistic level.

Order-adaptation can be easily introduced into the loop of the STW block 202, since a correct decision to stop the iteration with updated noise estimation is more likely. Approaches in accordance with the embodiment of the invention shown in FIG. 2 compare favorably, in terms of performance, with other order-adaptation approaches without noise updating, such as the Whittle-Wiggins-Robinson algorithm.

Figure 3:
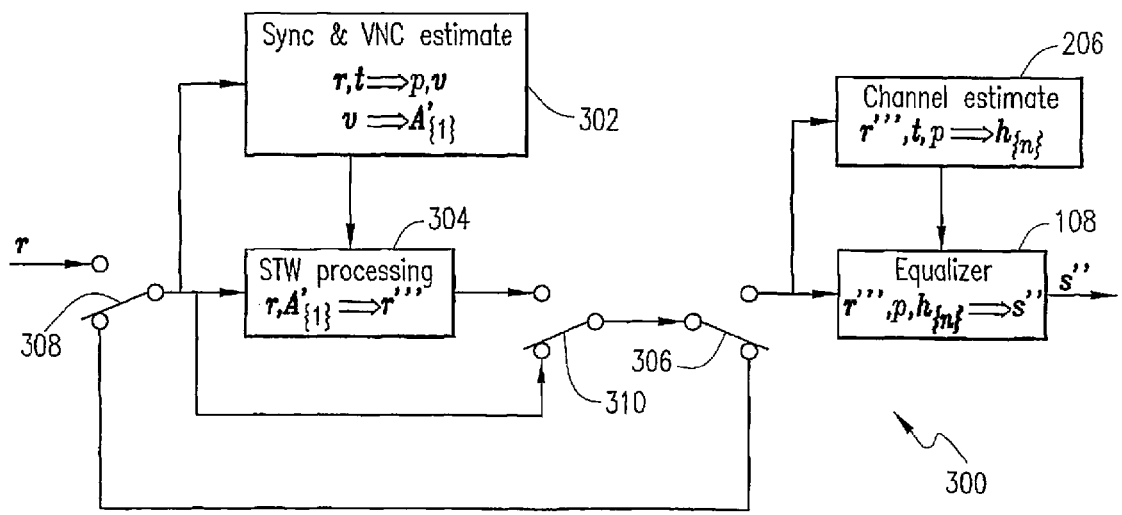
FIG. 3 is a functional block diagram that illustrates an exemplary SAIR process in accordance with a second embodiment of the present invention.

FIG. 3 is a functional block diagram that illustrates an exemplary SAIR process in accordance with a second embodiment of the present invention. In FIG. 3, ⇒indicates a dependency relationship. Variables shows in FIG. 3 are as follows:

r received signal
r'" updated received signal
t training sequence
p synchronization position
$h_{\{n\}}$ n tap channel estimate
$A'_{\{l\}}$ interference model
s" symbol estimate
v noise plus interference A SAIR process 300 begins with the received signal r being input to a synchronization and vector noise correlation estimation block (SVNC estimation block) 302 and a STW processing block 304 via a switch 308. The SVNC estimation block 302, the STW processing block 304, the switch 308, a switch 310, and a switch 306 form an iteration control loop. Due to synchronization introduced in the iteration control loop, a synchronization position after each first order STW whitening is adjusted. The adjustment of the synchronization position effectively avoids composite channel extension. The iteration control loop rectifies an error-prone synchronization attained in strong interference and adjusts the synchronization position so that a composite channel with a designated span is able to cover most of the signal energy.

After the received signal r has been input to the SVNC estimation block 302 and the STW processing block 304 via the switch 308, the switch 308 may be moved to a second position, as shown in FIG. 3. With the switch 308 in the position shown in FIG. 3, the switch 306 in the position shown in FIG. 3, and the switch 310 connected to the STW processing block 304, the iteration control loop is closed and an iterative estimation-whitening processing is implemented. When the received signal r is already sufficiently white, the received signal r may be input directly to the channel estimation block 206 and the equalizer 108 without passing through the SVNC estimation block 302 or the STW processing block 304 by setting the switch 308 to receive the received signal r, setting the switch 310 as shown in FIG. 3, and setting the switch 306 to be connected to the channel estimation block 206 and the equalizer 108.

Embodiments of the present invention utilize the iterative estimation-whitening processing as shown in FIG. 3, which processing can be illustrated in pseudo-code as follows:

```
RelaxSAIR(K) {
    Loop (K) {
        noise=maxEnergySynch (3,M);
        VNC_estimation (1, noise);
        STW_whitening (1, sig);
    }
}
```

A complex baseband receiver signal can be modeled in a vector-valued finite-impulse response (FIR) model of the radio channel $$x(n) = \sum_{m=0}^{M} h(m)s(n-m) + v(n) \quad (1)$$

where, in row vectors, a received signal is $x(n)=[x_r(n)x_i(n)]$, a radio channel is $h(n)=[h_r(n)h_i(n)]$, and noise plus interference is $v(n)=[v_r(n)v_i(n)]$. The STW processing in accordance with the invention, which utilizes both auto- and cross-correlation properties of the interference from in-phase and quadrature channels, is accomplished by filtering the received signal with a matrix polynomial (where each coefficient is a 2×2 matrix):

$$y(n) = \sum_{j=0}^{K} W_j x(n). \qquad (2)$$

In a prior approach using GLS, the matrix coefficients of a whitening filter $W_j$ are obtained by a joint composite channel/matrix coefficients estimation, while in accordance with principles of the present invention, the coefficients are obtained via a much-simpler VNC estimation.

Spatio-temporal colored noise in eqn (1) may be modeled as a Vector-valued Auto-Regressive (VAR) process. A first order VAR model may be written as $$v(n)A(D) = A_0 v(n) + v(n-1)A_1 = e(n) \qquad (3)$$

where a transfer function A(D) is a matrix polynomial of a delay operator with a leading unit tap, represented in a 2×2 identical matrix, $$A_0 = I_2; \quad A_k = \begin{bmatrix} a_{rr}(k) a_{ri}(k) \\ a_{ir}(k) a_{ii}(k) \end{bmatrix} \qquad (4)$$

$e(n) = [e_r(n) e_i(n)]$ is a vector of white noise, and $$Q = E\{e^T(n)e(n)\} = \begin{bmatrix} q_{rr}(k) q_{ri}(k) \\ q_{ir}(k) q_{ii}(k) \end{bmatrix} \qquad (5)$$

is a covariance matrix representing the spatio correlation of the noise from the in-phase and quadrature channels. Left multiply $v^T(n-k)$ to eqn (3) and take the expectation. Since $E\{v^T(n)e(n)\} = Q, E\{v^T(n-m)e(n)\} = 0$, the following Yule-Walker equations are obtained:

$$P_0 + P_{-1}A_1 = Q$$
$$P_1 + P_0 A_1 = 0 \qquad (6)$$

where $$P_k = E\{v^T(n-k)v(n)\} = E\left\{\begin{bmatrix} v_r(n-k) \\ v_i(n-k) \end{bmatrix}[v_r(n)v_i(n)]\right\} = \begin{bmatrix} p_{rr}(k) & p_{ri}(k) \\ p_{ir}(k) & p_{ii}(k) \end{bmatrix} \qquad (7)$$

is a matrix of auto- and cross-correlations of the noises from the in-phase and quadrature channels. From eqn. (6), the transfer function of a first order spatio-temporal whitening filter is easily obtained as $$W(z) = W_0 + W_1 z^{-1} = A_0 + A_1 z^{-1} = I_2 + (-P_0^{-1} P_1) z^{-1}. \qquad (8)$$

A lumped VNC approach has a disadvantage that the noise estimation in eqn (1) is not accurate, since the quality of the initial channel estimation is poor due to the presence of strong interferences. However, in accordance with principles of the present invention, successive first order whitening of the received signal is carried out, as shown in the pseudo-code above. The iteration upgrades the noise samples for each VNC estimation, and thus improves the quality of the whitening filter. After iterative STW processing, the noise is temporally white, and spatio de-correlation is necessary to decorrelate the noise from I and Q channels. The spatio de-correlation may be integrated with the last iteration of the STW by utilizing the Cholesky factorization. From the first equation in eqn. (6), the noise correlation matrix may be expressed as $$Q = P_0 + P_{-1}A_1 = P_0 + P^T_1 A_1. \qquad (9)$$

Applying Cholesky factorization to the inverse of the noise correlation matrix, $$L \cdot L^T = Q^{-1} \qquad (10)$$

the transfer function of the last STW iteration has the form $$W_K(z) = (W_0 + W_1 z^{-1})L = L + A_1 L z^{-1}. \qquad (11)$$

The VNC processing starts with an initial estimation of the noise samples. In accordance with principles of the invention, an estimation of synchronization residue is obtained from a three-symbol synchronization procedure. The synchronization is carried out by correlating a training sequence with a complex received signal:

$$\hat{h}(n) = \sum_{j=0}^{25} y(n+j)t(j). \qquad (12)$$

The synchronization is determined by a maximum energy accumulation across a span of the propagation channel:

$$n_P = \arg\max_n \left(\sum_{j=o}^{M} |\hat{h}(n+j)|^2\right), \quad n = -1, 0, 1 \qquad (13)$$

All of the symbols in the training sequence are used in eqn. (12), disregarding Inter-Symbol Interferences (ISI) caused by the multi-path propagation channel. In the working region of SAIR, the damage of ISI due to inclusion of the leading and tail symbols of the training sequence in the correlation is outweighed by the estimation gain in strong interferences.

The correlation result in eqn. (12) may be also used as a rough channel estimation, which is considered not accurate enough if used in equalization. However, it has been found that, in channels with strong interferences, this rough channel estimation can be used to calculate a better synchronization residue $$\hat{v}(n) = y(n) - \sum_{m=o}^{M} \hat{h}(m)s(n-m) \qquad (14)$$

where M denotes the channel span, which is typically limited by the equalizer implemented in hardware. The synchronization residue has been proven to be less biased than the noise estimate obtained by an LS based estimation as in current approaches.

Replacing the estimate of noise by that of synchronization residue decreases computational complexity only slightly, but can reduce the code size significantly, since a pre-calculated regressor table, which has to be stored for each training sequence and different channel span, in the channel estimation is no longer necessary. Another benefit of utilizing synchronization residue is that the span of the composite channel can be kept constant by adjusting the synchronization position over a three-symbol interval, which grants more freedom in choosing the number of iterations.

In contrast to current approaches, in which a lumped-model estimation is performed in a predetermined order before lumped STW processing, in the process 300, a relaxation approach based on vectorized noise correlation (VNC) is utilized. In the relaxation approach of the process 300, a first-order VNC estimation/STW processing is iterated m times. An algorithm in accordance with the embodiment of the present invention shown in FIG. 3 can be illustrated by the following pseudo-code, in which // represents non-code comments:

```
SairRelaxation (m) {
    For (k=0: m-1) {
        // noise estimation via 3-symbol sync
        v = syncNoise (r,t,n);
        // VNC
        P_j = E {v^T (i)v(i+j)};
        // 1st order VAR model of interference
        A(z) = I - P_0^-1 P_1 z^-1 ;
        if (k=m-1) {
            // spatio-decorrelation in last iteration
            Q = P_0 + P_1^T A_1;
            L·L^T = Q;
            A(z) = LA(z);
        }
        // STW filtering
        r = r · A;
    }
}
```

With an integrated synchronization in the iteration control loop, composite channel extension is avoided, which permits a SAIR implementation in current receiver architectures in which an equalizer is implemented in dedicated hardware that can accommodate only a fixed composite-channel span. The relaxation approach in accordance with the process 300 not only reduces computational complexity significantly, since all matrix operations are limited to 2×2 in dimension, but also results in a much better numerical condition than in a GLS model estimation. Due to improved estimation conditions, the SAIR process 300 has shown improved performance in channel conditions where background noise is at a realistic level (e.g., 20 dB<SNR<30 dB). When the background noise is at such a realistic level, GLS estimation does not perform very well due to estimation inaccuracies resulting from there being too many parameters to be estimated. In contrast, in a relaxation approach in accordance with principles of the invention, the number of parameters to be estimated is much smaller. The level of interference is reduced and synchronization position adjusted after each iteration, resulting in a better channel estimation. In accordance with an embodiment of the present invention, noise estimation is replaced by synchronization residue estimation, which improves performance without increasing computational complexity.

Order-adaptation can easily be introduced into the iteration control loop, since the iteration control loop is more likely to make a correct decision whether to stop the iteration with updated noise estimation. It is well known that all forms of whitening impair equalizer performance when there is only white noise present due to over-parameterization. Adaptivity must be introduced to alleviate the impairment. In accordance with principles of the invention, the order of SAIR is determined by the number of iterations of VNC estimation/STW processing. Thus a "none or all" adjustment may be integrated in the second iteration of the processing. If the STW gain, measured by the energy reduction of the synchronization residue, is not great enough:

$$\sum_j |\hat{v}_1(j)|^2 > \eta \sum_j |\hat{v}_0(j)|^2, \quad (15)$$

STW filtering processing is terminated. When a determination is made at STW filtering processing is to be terminated, the received signal r is input directly to the channel estimate block 206 and the equalizer 108 via the switch 310, which is placed in the position shown in FIG. 3, and the switch 306, which is put in a position to directly connect the received signal r to the equalizer 108 and the channel estimate block 206. To avoid synchronization residue estimation error due to signal magnitude variation, the matrix coefficients of the STW filter must be normalized. Normalization also reduces the probability of overflow in fixed-point implementations.

Following synchronization adjustment, the updated received signal r''' is output to the channel estimate block 206 and to the equalizer 108 via the switches 306 and 310. At the channel estimate block 206, a second n-tap channel estimation is performed. Since it is not necessary to take the whitening processing into consideration, a more computationally-efficient LS estimation can be applied directly. The n-tap channel estimate $h_{\{n\}}$ is output from the channel estimate block 206 to the equalizer 108. The equalizer 108 estimates data symbols of the transmission and yields the symbol estimate s''.

Approaches in accordance with the embodiment of the invention shown in FIG. 3 compare favorably, in terms of performance, with other order-adaptation approaches without noise updating. An example of the other order-adaptation approaches is the Whittle-Wiggins-Robinson algorithm.

Figure 4:
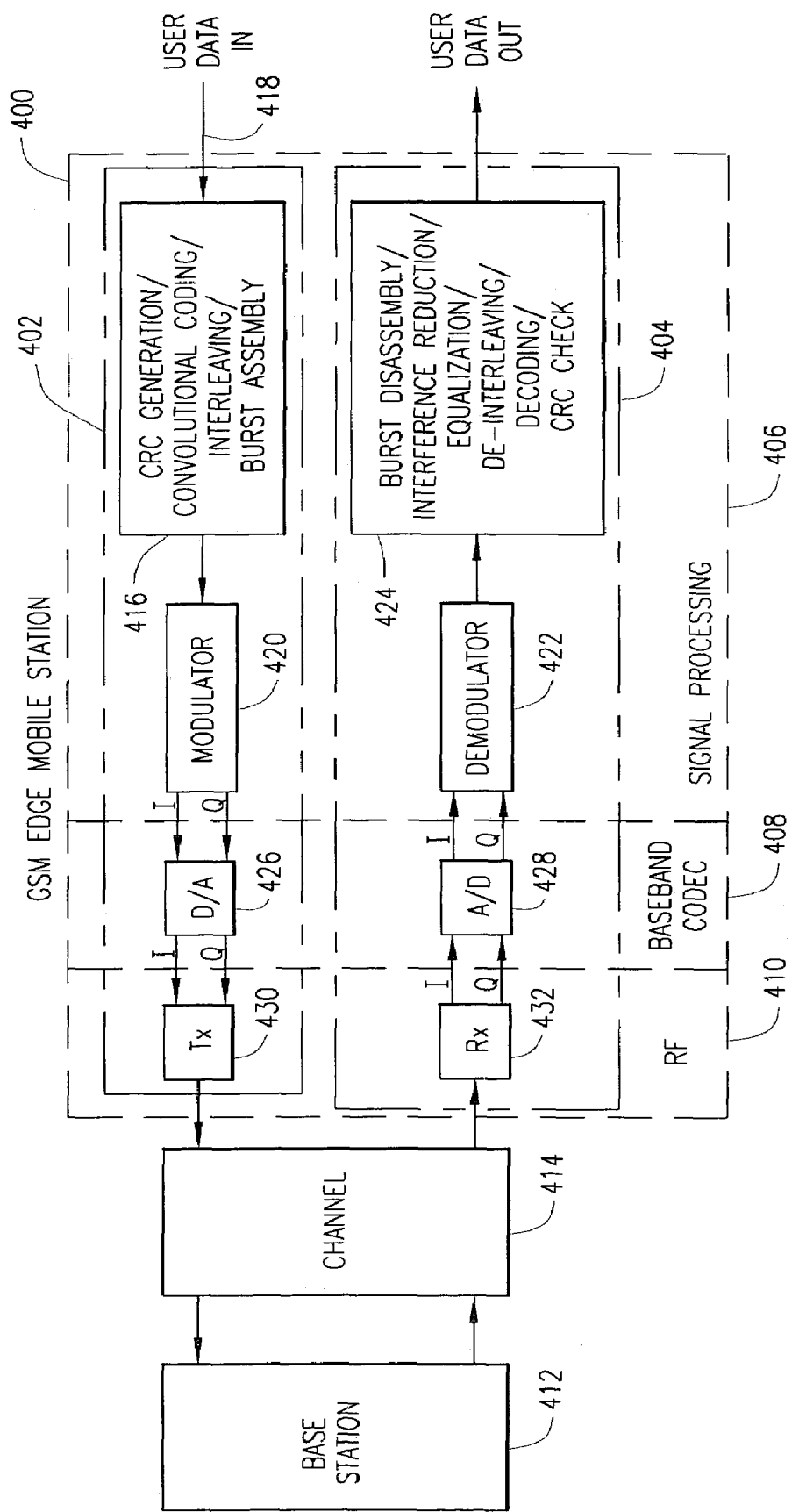
FIG. 4 is a diagram that illustrates an exemplary GSM EDGE-compatible mobile station in communication with a base station in accordance with principles of the present invention.

FIG. 4 is a block diagram that illustrates an exemplary GSM EDGE-compatible mobile station 400 in communication with a base station 412 in accordance with principles of the present invention. The mobile station 400 is intended to provide reliable data communications at rates of up to 384 kbit/s. The mobile station 400 includes a transmitter 402 and a receiver 404 divided into the following sections: signal processing circuitry 406; baseband code 408; and RF circuitry 410.

In a transmit direction, the signal processing circuitry 406 functions to protect data so as to provide reliable communications from the transmitter 402 to the base station 412 over a channel 414. Several processes performed by a channel coding block 416 are used to protect user data 418, including cyclic redundancy code (CRC) generation, convolutional coding, interleaving, and burst assembly. Resultant data is assembled into bursts, whereby guard and trail symbols are added in addition to a training sequence midamble that is added to the middle of the burst. Both the user data 418 and signaling information go through similar processing. The assembled bursts are modulated by a modulator 420.

In a receive direction, an output of the baseband codec 408 is demodulated using a demodulator 422. Several processes performed by a channel decoding block 424 in the signal processing circuitry 406 are applied to a demodulated output of the demodulator 422. The processes performed include burst disassembly, interference reduction in accordance with principles of the present invention, equalization, de-interleaving, convolutional decoding, and CRC check.

The baseband codec 408 converts transmit and receive data into analog and digital signals, respectively, via a digital-to-analog (D/A) converter 426 and an analog-to-digital (A/D) converter 428. The D/A converter 426 provides analog baseband I and Q signals to a transmitter 430 in the RF circuitry section 410.

In the receive direction, a signal transmitted by the base station 412 over the channel 414 is received by a receiver circuitry 432. Analog signals I and Q output from the receiver circuitry 432 are converted back into a digital data stream via the A/D converter 428. The I and Q digital data stream from the A/D converter 428 is filtered and demodulated by the demodulator 422 before being input to the channel decoding block 424. Several processes performed by the signal processing circuitry 406 are then applied to the demodulated output of the demodulator 422.

The mobile station 400 also performs other functions, such as, for example, synchronization, frequency and time acquisition and tracking, monitoring, measurements of received signal strength. Other functions include handling a user interface, signaling between the mobile station 400 and a network, SIM interface, etc. . . . Although embodiments of the invention have been described in the context of a mobile station, principles of the invention may be applied to other entities, such as, for example, a base station.

Embodiments of the present invention may be implemented in, for example, integrated circuits or chip sets, wireless implementations, and receiver system products. For example, a computer is operative to execute software adapted to perform the demodulation techniques of the present invention. Software is adapted to reside on a computer readable medium, such as, for example, a magnetic disk within a disk drive unit. The computer readable medium may also include a flash memory card, EEROM based memory, bubble memory storage, ROM storage, etc. The software adapted to perform according to principles of the invention may also reside, in whole or in part, in the static or dynamic main memories or in firmware within a processor (i.e. within microcontroller, microprocessor or microcomputer internal memory). Principles of the invention may also be applied in implementations in integrated circuits, field programmable gate arrays (FPGAs), chip sets or application specific integrated circuits (ASICs), wireless implementations, and other communication system products.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims.

What is claimed is:

1. A method for improving co-channel interference (CCI) and adjacent channel interference (ACI) performance in a receiver, the method comprising:
   performing synchronization and whitening of the received signal, the synchronization and whitening comprising performing the following steps at least one time:
   performing a synchronization and vector-noise-correlation estimation of an input signal to yield an interference model;
   performing a spatio-temporal whitening operation using the interference model and the input signal to yield an updated received signal wherein the spatio-temporal whitening operation is terminated in response to a determination that an energy reduction of a synchronization residue is not sufficiently large;
   wherein the input signal is the received signal when the step of performing the synchronization and vector-noise-correlation estimation is performed a first time of the at least one time; and
   wherein the input signal is the updated received signal when the step of performing the synchronization and vector-noise-correlation estimation is performed following the first time of the at least one time; and
   determining a channel estimate using the updated received signal.

2. The method of claim 1, further comprising:
   providing the channel estimate to an equalizer;
   providing the updated received signal to the equalizer; and
   outputting, by the equalizer, of a symbol estimate.

3. The method of claim 1, wherein the step of performing the spatio-temporal whitening operation comprises performing a first-order vector-noise-correlation estimation via synchronization residues.

4. The method of claim 1, wherein symbol extension of the received signal is avoided.

5. The method of claim 1, wherein the method is employed in a single-antenna-interference-rejection application.

6. An apparatus for reducing interference in a received signal, the apparatus comprising:
   means for performing a synchronization of the received signal to yield a synchronization position;
   means for determining an updated received signal using the synchronization position and the received signal, the means for determining the updated received signal comprising means for iteratively performing interference-model estimation and spatio-temporal whitening wherein the spatio-temporal whitening operation is terminated in response to a determination that an energy reduction of a synchronization residue is not sufficiently large;
   means for determining an updated synchronization position of the updated received signal; and
   means for determining a channel estimate using the updated synchronization position and the updated received signal.

7. The apparatus of claim 6, the apparatus further comprising:
   means for providing the channel estimate to an equalizer;
   means for providing the updated received signal to the equalizer; and
   means for outputting, by the equalizer, of a symbol estimate.

8. The apparatus of claim 6, wherein the means for determining the updated received signal comprises means for order adaptation and means for performing a first-order vector-noise-correlation estimation.

9. The apparatus of claim 6, wherein symbol extension of the received signal is avoided.

10. The apparatus of claim 6, wherein the apparatus uses single-antenna-interference rejection.

11. An apparatus for reducing interference in a received signal, the apparatus comprising:

means for performing synchronization and whitening of the received signal, the means for synchronization and whitening being adapted to perform the following steps at least one time:
  performing a synchronization and vector-noise-correlation estimation of an input signal to yield an interference model;
  performing a spatio-temporal whitening operation using the interference model and the input signal to yield an updated received signal, wherein the spatio-temporal whitening operation is terminated in response to a determination that an energy reduction of a synchronization residue is not sufficiently large;
  wherein the input signal is the received signal when the step of performing the synchronization and vector-noise-correlation estimation is performed a first time of the at least one time; and
  wherein the input signal is the updated received signal when the step of performing the synchronization and vector-noise-correlation estimation is performed following the first time of the at least one time; and
means for determining a channel estimate using the updated received signal.

12. The apparatus of claim 11, further comprising:
means for providing the channel estimate to an equalizer;
means for providing the updated received signal to the equalizer; and
means for outputting, by the equalizer, of a symbol estimate.

13. The apparatus of claim 11, wherein the step of performing the spatio-temporal whitening operation comprises performing a first-order vector-noise-correlation estimation via synchronization residues.

14. The apparatus of claim 11 wherein symbol extension of the received signal is avoided.

15. The apparatus of claim 11, wherein the apparatus uses single-antenna-interference rejection.

16. An article of manufacture for reducing interference in a received signal, the article of manufacture comprising:
  at least one computer readable medium;
  computer executable instructions encoded on the at least one computer readable medium, the computer executable instructions configured to be readable from the at least one computer readable medium by at least one processor and thereby cause the at least one processor to operate as to:
    perform a synchronization of the received signal to yield a synchronization position;
    determine an updated received signal using the synchronization position and the received signal, the step of determining the updated received signal comprising iteratively performing interference-model estimation and spatio-temporal whitening wherein the spatio-temporal whitening operation is terminated in response to a determination that an energy reduction of a synchronization residue is not sufficiently large;
    determine an updated synchronization position of the updated received signal; and
    determine a channel estimate using the updated synchronization position and the updated received signal.

17. An article of manufacture for reducing interference in a received signal, the article of manufacture comprising:
  at least one computer readable medium;
  computer executable instructions encoded on the at least one computer readable medium, the computer executable instructions configured to be readable from the at least one computer readable medium by at least one processor and thereby cause the at least one processor to operate as to:
    perform synchronization and whitening of the received signal, the synchronization and whitening comprising performing the following steps at least one time:
      performing a synchronization and vector-noise-correlation estimation of an input signal to yield an interference model;
      performing a spatio-temporal whitening operation using the interference model and the input signal to yield an updated received signal wherein the spatio-temporal whitening operation is terminated in response to a determination that an energy reduction of a synchronization residue is not sufficiently large;
      wherein the input signal is the received signal when the step of performing the synchronization and vector-noise-correlation estimation is performed a first time of the at least one time; and
      wherein the input signal is the updated received signal when the step of performing the synchronization and vector-noise-correlation estimation is performed following the first time of the at least one time; and
    determine a channel estimate using the updated received signal.

* * * * *